Dec. 2, 1941.                    R. E. CRYOR                    2,264,967
                         INSULATING PIPE COVERING
                          Filed Feb. 15, 1939              2 Sheets-Sheet 1
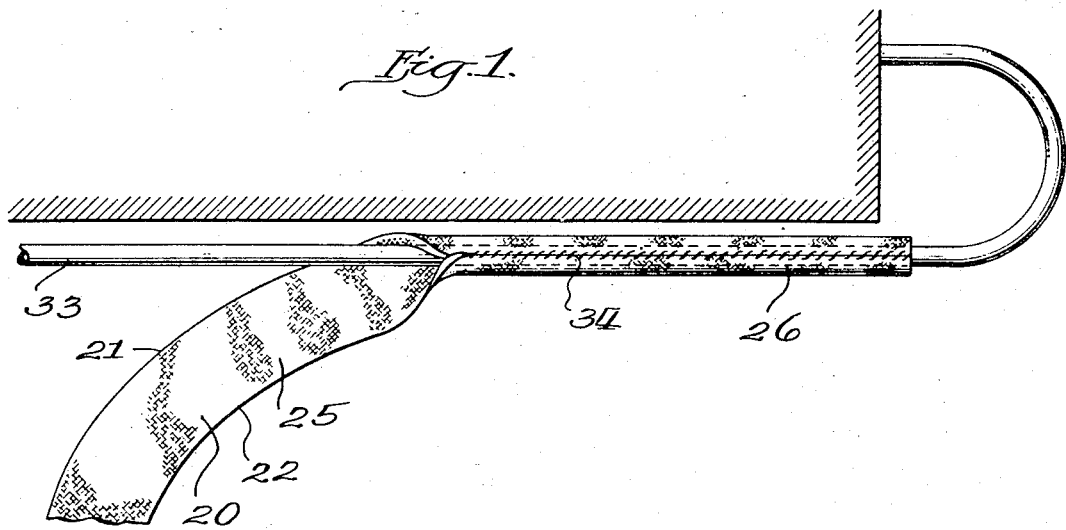
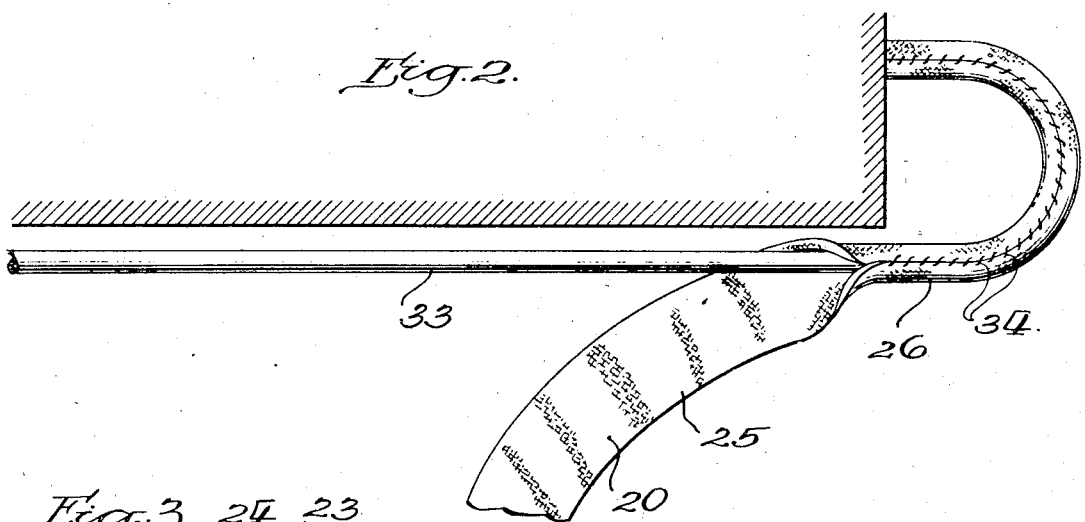
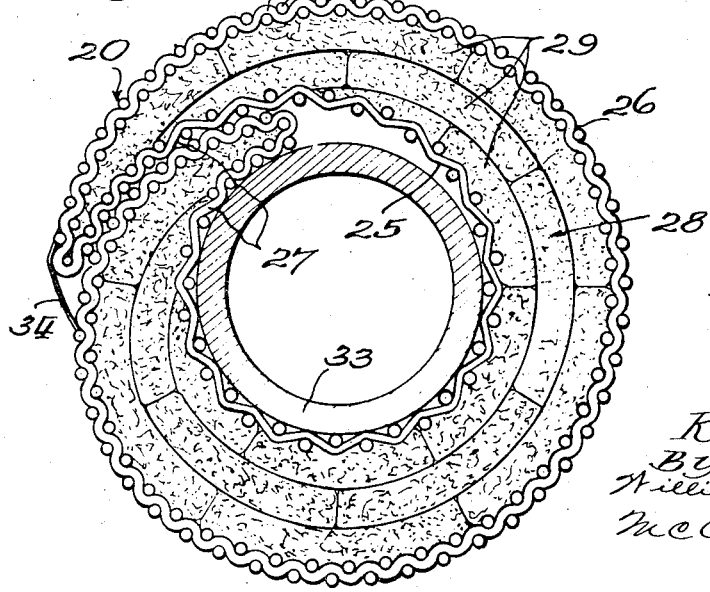
Inventor:
Robert E. Cryor
By Williams, Bradbury,
McCaleb & Hinkle
Attys.

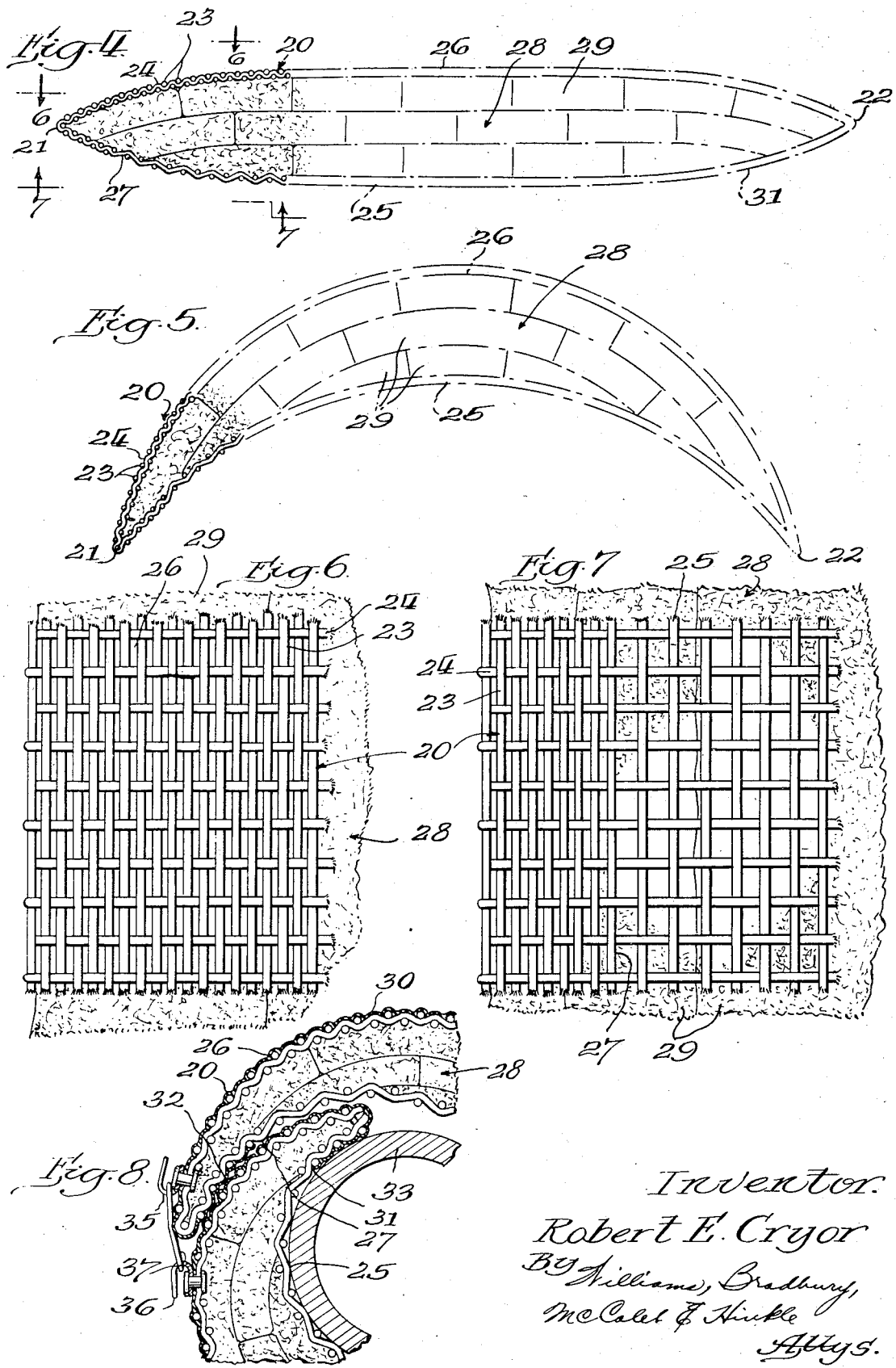

Patented Dec. 2, 1941

2,264,967

UNITED STATES PATENT OFFICE 2,264,967

INSULATING PIPE COVERING

Robert E. Cryor, Oak Park, Ill., assignor to Union Asbestos & Rubber Company, Chicago, Ill., a corporation of Illinois Application February 15, 1939, Serial No. 256,464

2 Claims. (Cl. 154—44)

The present invention relates to insulating pipe coverings and is particularly concerned with such pipe coverings of the type comprising a woven or braided insulating sheath having a filling of large, loose, soft insulating fibers.

One of the objects of the invention is the provision of an improved method of applying pipe coverings, which results in the provision of a better insulating covering and involves the use of less labor in its application.

Another object of the invention is the provision of an improved insulating pipe covering in the form of an elongated strip which is adapted to be applied longitudinally to a pipe with overlapping edges, and which is peculiarly adapted to be applied according to the present method to curved pipes.

Another object of the invention is the provision of an improved pipe covering having a higher insulating value, due to the use of a diminished number of joints, and by means of the provision of a better joint whenever a joint is used.

Another object of the invention is the provision of an improved insulating pipe covering which may be waterproofed and applied as a single unit with a minimum amount of labor.

Other objects and advantages of the invention will be apparent from the following description and the accompanying drawings, in which similar characters of reference indicate similar parts throughout the several views.

Referring to the drawings, of which there are two sheets,

Fig. 1 is a fragmentary view of a pipe, which is to be insulated, shown in the course of the method of application of my insulation before the insulation has been applied to the curved section of the pipe;

Fig. 2 is a similar view shown after the insulation has been applied to the curved section of the pipe;

Fig. 3 is an enlarged sectional view taken on a plane perpendicular to the axis of the pipe at the point of the section;

Fig. 4 is a transverse sectional view through an insulating strip constructed according to the invention;

Fig. 5 is a similar view taken through a strip which is pre-formed for curvature about the pipe in one particular way;

Fig. 6 is a fragmentary elevational view of a portion of the fabric at the outer layer of the insulation;

Fig. 7 is a view similar to Fig. 6 of the fabric at the inner layer which is in contact with the pipe; and Fig. 8 shows a fragmentary sectional view, like Fig. 3, of a modified construction.

Referring to Fig. 4, the insulation constructed according to the present invention is preferably provided with a woven sheath 20, although in some embodiments of the invention the sheath may be braided or knit. The sheath 20 is preferably in the form of an endless tube, but in some embodiments of the invention may be constructed out of a sheet of fabric, the edges of which have been stitched together at one of the edges 21 or 22 of the sheath. The fabric of which the sheath is constructed may consist of a standard weave having warp threads 23 and filler threads 24, but for the purpose of effecting a saving a lesser number of the warp threads may be used at 25, on that side 25 of the sheath which is adjacent the pipe. The opposite side or outside 26 of the sheath and all the rest of the sheath to the point 27 is of the standard weave shown in Fig. 6.

The sheath is preferably of the shape shown in Fig. 4, being of a standard thickness at the middle portion and tapering to a relatively sharp edge at 21 and 22. In some embodiments of my invention the shealth may be pre-shaped, as shown in Fig. 5, in the form of a crescent, the inner side 25 being shorter than the outer side 26. This diminishes the amount of compression which is placed upon the inner side 25 and the tension which is placed upon the outer side 26 of the sheath when it is applied to a pipe, as shown in Fig. 3.

In other embodiments of the invention the stitched tube or jacket need not be stitched at the edges of the tape, but may be stitched in such manner that the stitching may be turned to the bottom side of the tape.

The sheath is provided with a filler 28, which may consist of a multiplicity of large, loose, soft insulating members 29, or rovings of carded asbestos fibers. Instead of rovings, the filler 28 may in some embodiments be in the form of a pre-formed felted filler of asbestos fibers.

In other embodiments of the invention a filler of glass wool or quartz wool fibers may be utilized for filling the sheath, and glass or glass fibers may also be utilized in making the threads of which the sheath is woven. When the filler 28 is drawn longitudinally into the sheath 20, the filler is preferably provided with longitudinally extending threads and spirally extending threads, giving it the requisite amount of tension for this procedure, but in other embodiments of the invention where the filler is not drawn into the sheath longitudinally, such threads may be eliminated. The filler 28 is pre-shaped by providing a greater amount of the filler at the central portions of the sheath and a lesser amount of the filler at the edges thereof.

Referring to Fig. 8, the outer surface of the sheath 20 may be provided with a waterproofing coat 30 in the form of a layer of waterproofing composition, including rubber latex, rubber cement, chlorinated rubber compositions, or other flexible waterproofing compositions impregnating the outermost fibers of the warp and weft threads 23 and 24 from approximately the point 27 on the lower side of the sheath in Fig. 4 around the edge of the sheath and over the top side of the sheath and around the opposite edge 22 to a point 31 on the lower side of the sheath in Fig. 4 at the right hand side. Thus, there is a watertight contact at 32 between adjacent layers of the waterproofing 30 when the insulation is wrapped longitudinally about a pipe 33, as shown in Fig. 8, and this waterproof contact will be present no matter which edge of the sheath is uppermost on the pipe. In some embodiments of the invention, as shown in Figs. 1, 2 and 3, the insulation is secured about the pipe by stitching with asbestos, fiber yarn, or quartz wool yarn, with or without wire reinforcing, or with suitable wire, at 34; but in other embodiments of the invention, as shown in Fig. 8, the sheath may be provided with lacing hooks 35, 36 used for securing the lacing 37 which draws the adjacent parts of the sheath together and secures it tightly about the pipe 33. As distinguished from many insulating tapes of the prior art which are secured spirally about a pipe, the insulation constructed according to my present invention is secured longitudinally about the pipe with its thin edges overlapping until they form a layer of substantially equal thickness to the thickness of the main section of the insulation.

It is found that a plurality of pipe sizes may be covered by tape of the same width, for the reason that the external dimensions of some of these pipes of different internal size are substantially the same. Thus, for example, an insulating tape of five and a quarter inches wide by three-eighths inch thick may be used for pipe sizes of one-quarter inch, three-eighths inch and a half inch. A tape seven and a quarter inches wide by one-half inch thick may be used for pipe sizes of three-quarters inch and one inch. The thickness measurement specified is the minimum thickness of the tape when snugly wrapped and fastened on the pipe. Such dimensions are, of course, merely exemplary, and for the purpose of showing the application of the invention, and my insulating tape may be constructed of various different dimensions.

Such insulating tapes have their most advantageous application upon curved pipes, usually small, which are used in the naval and marine applications, where the pipes are provided with welded joints and curve in various directions, instead of being provided with elbows. It should be understood, however, that the invention is applicable to pipes of all sizes and may also be used upon pipes provided with elbows or other standard fittings by being stitched or otherwise secured in place.

According to the prior art rigid insulation had been cut into a multiplicity of small tubular segments which, when fitted together, would cover the curve, and these segments were placed on the pipe in the form of half tubes and secured together by means of fabric tape. The cracks between the segments had to be filled with plastic insulation and the pipe covering completed by means of a fabric or canvas covering which involved a great deal of labor.

Insulating tape of the type which is wrapped spirally about such pipes presents quite a difficulty in some situations, particularly where the pipe is close to a wall. Such spirally wrapped tape is most easily applied by keeping the tape in the form of a roll and passing the roll about the pipe as the tape is wrapped spirally on the pipe. If the tape is not kept in the roll, then there are long lengths of the tape to be dragged over the pipe, and that procedure had to be resorted to with spirally wrapped tape when the pipe was too close to the wall to admit the passage of the roll.

These difficulties are solved by means of the present invention, which involves what I believe to be a novel method of applying insulating tape to a pipe. According to my method the tape is provided in standard lengths such as, for example, twenty-five feet, although any length of tape may be made. The tape is wrapped about the pipe with its greatest dimension extending longitudinally of the pipe, and its thinned edges overlapping, as shown in Fig. 3. When used for marine purposes, the tape is preferably snugly stitched about the pipe, the line of stitching being shown at 34, and this stitching may be done with the tape about the pipe in a place which is most readily accessible, or on a straight section of the pipe, as shown in Fig. 1. After a portion of the tape has been stitched, the tubular insulation is then slid longitudinally on the pipe from the position of Fig. 1 to that of Fig. 2, and the stitching may be turned around so that it is faced backward toward the wall or on the inside of the curve. The stitching is preferably toward the wall for improving the appearance of the finished job and for protecting the stitching from the wear and tear which may come on it if it is at the outermost part of the pipe. Stitching is also preferably on the innermost side of the curve where it is subjected to compression, rather than the tension which takes place at the outer part of the curve.

During the act of moving the insulation from the straight section of the pipe to the curved section, that part of the insulation on the inside of the curve is compressed and that on the outer side is placed under tension, but the present insulation is adapted to conform itself to the shape of the pipe and will fit any type of curve. Such insulation may be applied to the pipe in a fraction of the time necessary for the old application of half tubes of rigid insulation cut into segments. It may also be applied more quickly than the spirally wrapped tape, and it has a better insulating value than either of these examples of the prior art because there is only one joint extending longitudinally of the pipe, and that joint may be made a relatively long overlapping joint. There is little chance of any leakage of air through such a long joint, and the effective cross section of the tape at the joint may be made equal to that of the main section of the insulation.

It is found that the thermal conductivity is 25% to 40% less than that of spiral tape of the same thickness after its application to the pipe. The present insulation is also capable of being waterproofed in advance of its application, which eliminates the difficulties of applying a waterproofing layer to pipe in inaccessible places. Its application to the pipe may be facilitated by the use of lacing hooks and a lacing, as shown in Fig. 8. Instead of lacing or stitching, it may also be held in place by a plurality of the standard bands or straps of thin sheet metal extending about the insulation at regularly spaced points, but such bands have the disadvantage that they do not hold the free edges of the insulating tape together continuously along the pipe.

It will thus be observed that I have invented an improved method of application of insulating tape to pipes, which results in a great saving of labor and a better insulation, particularly for curved pipes. My insulation has a higher insulating value when applied than a spiral insulation of the same thickness on account of the lesser length of joints between parts of the insulation.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim is new and desire to secure by Letters Patent of the United States is:

1. An insulating covering for curved pipes adapted to be assembled on a straight section of pipe and slid longitudinally from the straight section on the curved pipe to provide a uniform insulation for said curved pipe comprising a woven sheath of asbestos fibers, said sheath having a relatively soft pair of walls joined together at relatively sharp edges, a temperature resistant insulating filling for said sheath, said filling comprising a plurality of large loose soft members assembled and shaped to provide an assembly with tapered edges, and tension means comprising cord located at one edge of the sheath and extending to parts of the sheath adjacent to said edge and having a plurality of points of securement along the joint whereby the tapered edges of the covering are drawn over each other in overlapping engagement and are adapted to be maintained closed when applied to said curved pipe.

2. An insulating covering for curved pipes adapted to be assembled on a straight section of pipe and slid longitudinally from the straight section on the curved pipe to provide a uniform insulation for said curved pipe, comprising a relatively soft woven sheath having a pair of walls joined together at relatively sharp edges, a temperature resistant insulating filling for said sheath, said filling comprising a plurality of large loose soft members assembled and shaped to provide an assembly with tapered edges, said assembly being normally substantially flat, soft and bendable, and being adapted to be wrapped sheath-like about pipes of different diameters, whereby the tapered edges of the covering are drawn over each other in overlapping engagement and are adapted to be maintained closed when applied to said curved pipe by tension fastening means spanning the joined overlapping edges of said covering.

ROBERT E. CRYOR.